UNITED STATES PATENT OFFICE.

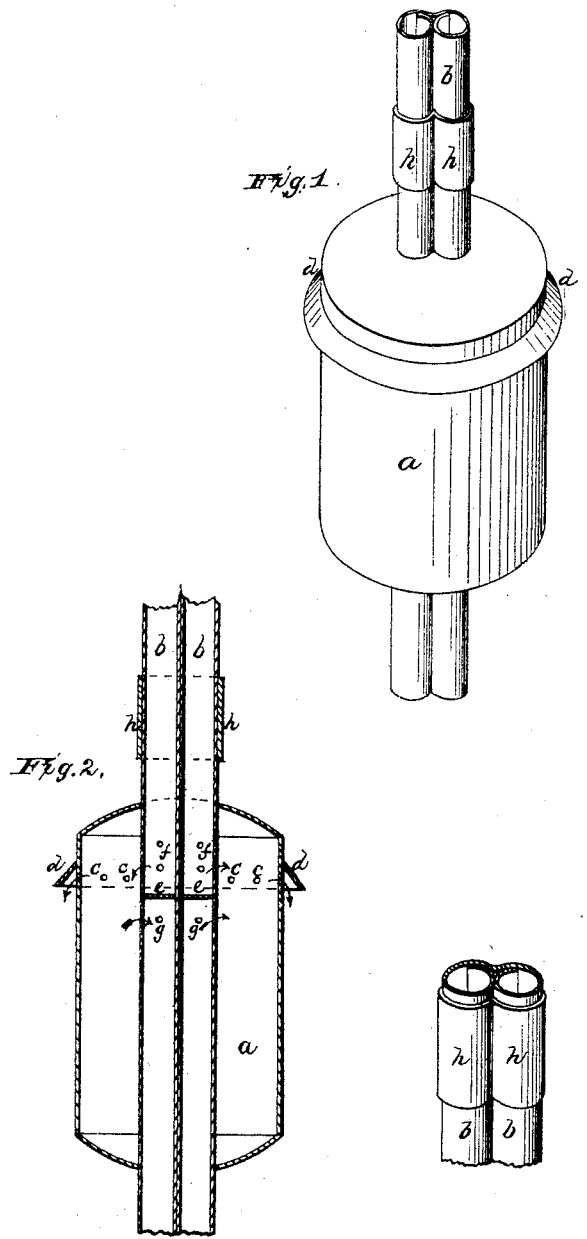

LAWSON ADAMS, OF OMAHA, NEBRASKA.

IMPROVEMENT IN LIGHTNING-RODS.

Specification forming part of Letters Patent No. 213,367, dated March 18, 1879; application filed July 10, 1878.

*To all whom it may concern:*

Be it known that I, LAWSON ADAMS, of Omaha, Douglas county, State of Nebraska, have invented certain new and useful Improvements in Lightning-Rods, and in the use, application, and operation of the same, of which the following is a specification, to wit:

My invention relates to a tank of copper or other suitable material to be filled with water and placed below the earth, to be used in connection with rods passing through the same, the purpose being to maintain at all times sufficient moisture at the lower ends of the rods to arrest, neutralize, and destroy the effect of the electricity when said tank and the moisture and water therein are reached by said electricity in its passage down the rod, and to have the rods enter into or pass through the tank.

In the drawings hereunto attached, and made a part hereof, Figure 1 represents a perspective view; and Fig. 2, a longitudinal section of said tank, showing the rods connecting and passing through the same.

Said tank may and is intended to be used in connection with my patent (Reissue No.7,939, dated November 6, 1877, to which reference is had) or any other rod to which it may be desired to apply the same.

To enable one skilled in the art to make, use, and operate my invention, I describe it in detail as follows:

$a\ a$ represent the said tank, which is constructed of copper or other suitable material. $b\ b$ show the rods connecting and passing through the same. $c\ c$ are holes around the tank to allow the escape of any surplus of water, which, during a shower, or at any other time, or in any other manner, may by the rods or otherwise be conducted into said tank. $d\ d$ represent a flange or cover around the outside of said tank to protect the holes from being filled with earth. $e\ e$ are stoppers or obstructions in the rods, so placed as to stop the flow of water down the same and turn it out through the holes $f\ f$ into the tank to replace any water that may have escaped by evaporation or otherwise, and to refill said tank. $g\ g$ are also holes in the rod below said stopper or obstruction, by which, when water rises in said tank to the height of the same, it may enter said rods and pass down through the same into the earth, or into another tank or tanks to be set below the first, if, as sometimes desired, one or more be so placed, said tanks to be placed in the earth, or in or on the building for the better protection of the same. $h\ h$ represent a treble joint to strengthen, and non-corrosive, to permanently secure its conductivity equally with other parts of the rod.

Having thus fully described my invention, what I claim as new, and desire to secure by Letters Patent, is—

A tank of suitable size, constructed of copper or other suitable material in connection with a rod or rods, or passing through the same, to be used in the manner and for the purpose in substance, as in detail above stated and set forth.

LAWSON ADAMS.

Witnesses:
   CHAS R. REDICK,
   C. S. BALDWIN.